United States Patent [19]
Osterberg

[11] Patent Number: 5,918,865
[45] Date of Patent: Jul. 6, 1999

[54] LOAD ISOLATOR APPARATUS

[75] Inventor: David A. Osterberg, Glendale, Ariz.

[73] Assignee: Honeywell Inc., Minneapolis, Minn.

[21] Appl. No.: 08/790,647

[22] Filed: Jan. 29, 1997

[51] Int. Cl.$^6$ ....................................................... F16F 7/10
[52] U.S. Cl. ...................... 267/221; 267/64.25; 267/136;
188/379; 188/298; 188/299.1; 188/312
[58] Field of Search ................................... 267/136, 195,
267/221, 122, 64.25; 188/299.1, 378, 312,
317, 314; 248/562, 636, 631, 638, 550;
280/124.08

[56] References Cited

U.S. PATENT DOCUMENTS

| | | | |
|---|---|---|---|
| 3,186,702 | 6/1965 | Taylor | 267/1 |
| 3,204,945 | 9/1965 | Taylor | 267/64 |
| 3,256,005 | 6/1966 | Taylor | 267/64 |
| 3,303,856 | 2/1967 | Taylor | 138/31 |
| 3,933,344 | 1/1976 | Taylor | 267/64 A |
| 3,947,004 | 3/1976 | Taylor | 267/65 R |
| 3,980,358 | 9/1976 | Davis | 308/173 |
| 4,031,978 | 6/1977 | Taylor | 180/91 |
| 4,064,977 | 12/1977 | Taylor | 188/317 |

(List continued on next page.)

OTHER PUBLICATIONS

Document entitled "Adaptable Passive Viscous Damper (an Adaptable D–Strut™)" by Porter Davis and David Cunningham of Honeywell Inc., Satellite Systems Operation; Glendale, AZ 85308 and Andy Bicos and Mike Enright of McDonnell Douglas Aerospace; Huntington Beach, CA 92647; pp. 1–12.

Document entitled "Actuator With Built–in Viscous Damping for Isolation and Structural Control" by T. Tupper Hyde and Eric H. Anderson of Space Engineering Research Center; Department of Aeronautics and Astronautics; Massachusetts Institute of Technology, Cambridge, Mass. 02139.

Document entitled "An Advanced D–Strut™" by L. Porter Davis and Steven D. Ginter of Honeywell Inc. Satellite Systems Operation presented at the Damping 91 Conference, San Diego, California; pp. 1–17.

Document entitled "Design of a D–Strut™ and Its Application Results in the JPL, MIT, and LaRC Test Beds" by L. Porter Davis and Brian J. Workman of Honeywell Inc., Satellite Systems Operation; Glendale, AZ and Cheng–Chih Chu of Jet Propulsion Laboratory; Pasadena, California and Eric H. Anderson of Massachusetts Institute of Technology, Space Engineering Research Center; Cambridge, Massachusetts; Presented at the American Institute of Aeronautics and Astronautics Structural Dynamics Meeting; Dallas, Texas; Apr. 13, 1992; pp. 1–7.

Document entitled "Advanced 1.5 HZ Passive Viscous Isolation System" by Porter Davis, David Cunningham and John Harrell; presented at the 35th AIAA SDM Conference; Hilton Head, South Carolina; Apr. 1994, copyright 1994, Honeywell Inc. pp. 1–11.

Document entitled "Second Generation Hybrid D–Strut™" by Porter Davis and Delano Carter of Honeywell Inc., Satellite Systems Operation; Glendale, AZ 85308 and T. Tupper Hyde of Space Engineering Research Center; Massachusetts Institute of Technology, Cambridge, Massachusetts 02139; presented at the SPIE Smart Structures and Materials Conference; Feb. 1995; San Diego, California, pp. 1–15.

Document entitled "Satellite Isolation and Structural Control"; prepared by Porter Davis and Tim Hintz; Jan. 1995.

Primary Examiner—Peter M. Poon
Attorney, Agent, or Firm—Charles J. Ungemach

[57] ABSTRACT

A damping mounting structure for use between two members for isolating motion changes which incorporates a plurality of dampers connected between the two members in a closed geometric shape and which uses cross connections between the dampers located on opposite sides of the geometric shape so that translation motion between the two members is less stiff than rotational motion between the two members.

20 Claims, 2 Drawing Sheets

U.S. PATENT DOCUMENTS

| | | | |
|---|---|---|---|
| 4,150,819 | 4/1979 | Taylor | 267/136 |
| 4,242,917 | 1/1981 | Bennett et al. | 74/5.5 |
| 4,254,988 | 3/1981 | Taylor et al. | 296/190 |
| 4,265,344 | 5/1981 | Taylor | 188/322 |
| 4,389,045 | 6/1983 | Taylor | 267/8 R |
| 4,532,856 | 8/1985 | Taylor | 92/168 |
| 4,535,876 | 8/1985 | Taylor | 188/311 |
| 4,548,041 | 10/1985 | Taylor | 60/632 |
| 4,558,767 | 12/1985 | Taylor | 188/282 |
| 4,564,048 | 1/1986 | Taylor | 138/31 |
| 4,582,303 | 4/1986 | Taylor | 267/64.13 |
| 4,585,099 | 4/1986 | Taylor | 267/322.19 |
| 4,591,030 | 5/1986 | Antkowiak | 188/268 |
| 4,591,033 | 5/1986 | Tyalor | 188/317 |
| 4,611,794 | 9/1986 | Taylor | 267/64.13 |
| 4,628,579 | 12/1986 | Taylor | 29/422 |
| 4,630,805 | 12/1986 | Taylor | 267/64.13 |
| 4,638,895 | 1/1987 | Taylor et al. | 188/280 |
| 4,674,398 | 6/1987 | Taylor | 91/459 |
| 4,718,648 | 1/1988 | Taylor | 267/64.13 |
| 4,730,706 | 3/1988 | Taylor et al. | 188/297 |
| 4,738,339 | 4/1988 | Taylor | 188/322.19 |
| 4,749,071 | 6/1988 | Taylor | 188/322.19 |
| 4,760,996 | 8/1988 | Davis | 267/122 |
| 4,768,627 | 9/1988 | Taylor | 188/280 |
| 4,773,164 | 9/1988 | Taylor et al. | 33/520 |
| 4,793,451 | 12/1988 | Taylor | 188/316 |
| 4,815,574 | 3/1989 | Taylor et al. | 188/280 |
| 4,819,919 | 4/1989 | Taylor | 267/64.13 |
| 4,848,525 | 7/1989 | Jacot et al. | 188/378 |
| 4,867,043 | 9/1989 | Antkowaik | 92/165 R |
| 4,867,286 | 9/1989 | Taylor | 188/282 |
| 4,877,114 | 10/1989 | Taylor | 188/285 |
| 4,877,226 | 10/1989 | Taylor | 267/196 |
| 4,892,051 | 1/1990 | Taylor et al. | 114/1 |
| 5,121,128 | 6/1992 | Van Lidth de Jeude et al. | 343/741 |
| 5,133,435 | 7/1992 | Taylor | 188/381 |
| 5,217,246 | 6/1993 | Williams et al. | 280/840 X |
| 5,219,051 | 6/1993 | Davis | 188/378 |
| 5,249,783 | 10/1993 | Davis | 267/217 |
| 5,265,552 | 11/1993 | Taylor | 114/219 |
| 5,305,981 | 4/1994 | Cunningham et al. | 248/550 |
| 5,318,156 | 6/1994 | Davis | 188/298 |
| 5,332,070 | 7/1994 | Davis et al. | 188/298 |
| 5,337,864 | 8/1994 | Sjostrom | 188/378 |
| 5,626,332 | 5/1997 | Phillips et al. | 267/140.14 |

LOAD ISOLATOR APPARATUS

BACKGROUND OF INVENTION

1. Field of the Invention

The present invention relates to apparatus operable to isolate a load from the base device to which it is attached and more particularly to utilize a novel suspension and damping concept to provide vibration isolation between the load and the base in translational degrees-of-freedom while increasing the stiffness for rotational degrees-of-freedom.

2. Description of the Prior Art

Although load vibration isolation has application in various fields including automotive, machinery and the like, the present invention is described in the environment of launch vibration isolation of a payload or satellite, mounted on a launch vehicle. Isolation is achieved by placing elastic members between the launch vehicle and the payload and then placing damping members across the elastic members to provide damping. In such applications, it is difficult to support the payload at the center-of-gravity allowing translational motion to be cross-coupled into rotational motion causing the payload to sway. This rotation is undesired since, for payloads such as inertial measurement units (IMU's) their alignment must be maintained with respect to the vehicle, and, for satellites, the sway uses up the available "rattle space" between the satellite and the inside of the aerodynamic faring. Accordingly, it is advantageous to stiffen the rotational degrees-or-freedom while softening the translational degrees of freedom.

In the prior art, the payload has been supported by independent spring/damper units, typically mounted at various angles to provide the proper stiffness in each degree-of-freedom. In such a configuration, each spring/damper unit operates independent of the others. Other approaches have been to distribute the stiffness and damping around the base of the payload. The rotational stiffness of these isolation systems are limited by the center-of-gravity offset of the payload and the diameter across the base (mounting circle) and, while changing the angles of the spring/damper units allows some freedom in selecting the proper stiffness, the results are limited.

BRIEF DESCRIPTION OF THE INVENTION

The present invention overcomes the limitations of the prior art by cross-coupling opposite damping elements, rather than having them operate independently, to provide a soft damped suspension in transition and a stiff damped suspension in rotation. The invention may also use an accumulator connected to the system to provide volumetric compensation for fluid expansion over temperature variations and to pressurize the system.

DETAILED DESCRIPTION OF THE PREFERRED EMBODIMENTS

Figure 1:
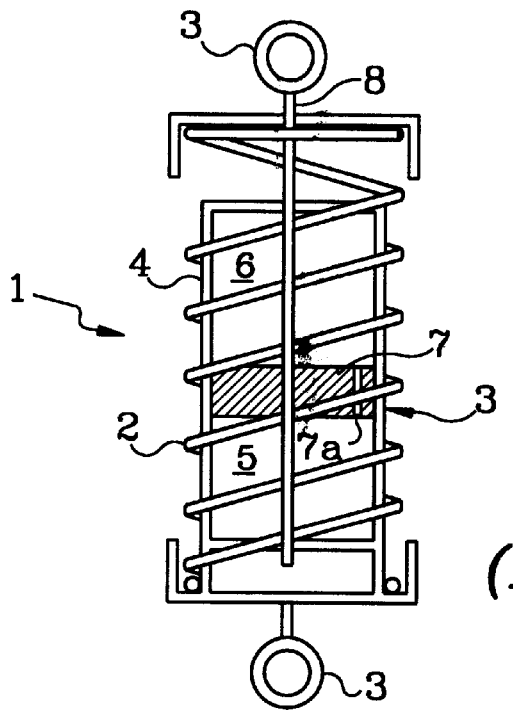
FIG. 1 shows a spring/damper device known in the prior art.

FIG. 1 shows a spring/damper device 1 presently available in the prior art. Spring damper 1 has a spring 2 wound around a viscous damper 3 having a housing 4. Spring 2 provides static stiffness and damper 3 provides a damping force which is generated by a fluid in chambers 5 and 6 in housing 4 flowing either around a piston 7 separating chambers 5 and 6 or through a restrictive passage 7a in piston 7. Piston 7 has a piston rod 8 extending upwardly through a seal in the top of chamber 6 and downwardly through a seal in the bottom of chamber 5. Rotational pivots 9 are connected to the piston rod 8 and to the lower part of housing 4 to allow small rotations when spring/damper 1 is connected between a payload and a launch vehicle as will be better seen in connection with FIGS. 2a and 2b.

Figure 2A:
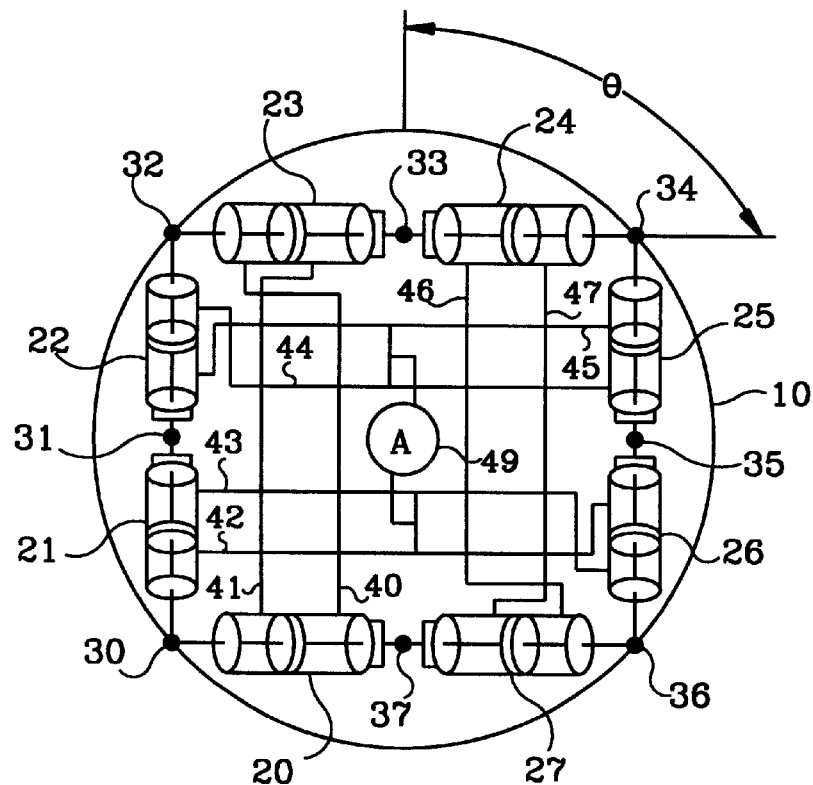
FIGS. 2a and 2b show a top view and side view of the spring/dampers (without the springs) in an isolation section between a vehicle and a payload of the present invention; and, FIG. 3 shows the cross coupling arrangement of the present invention.
Figure 2B:
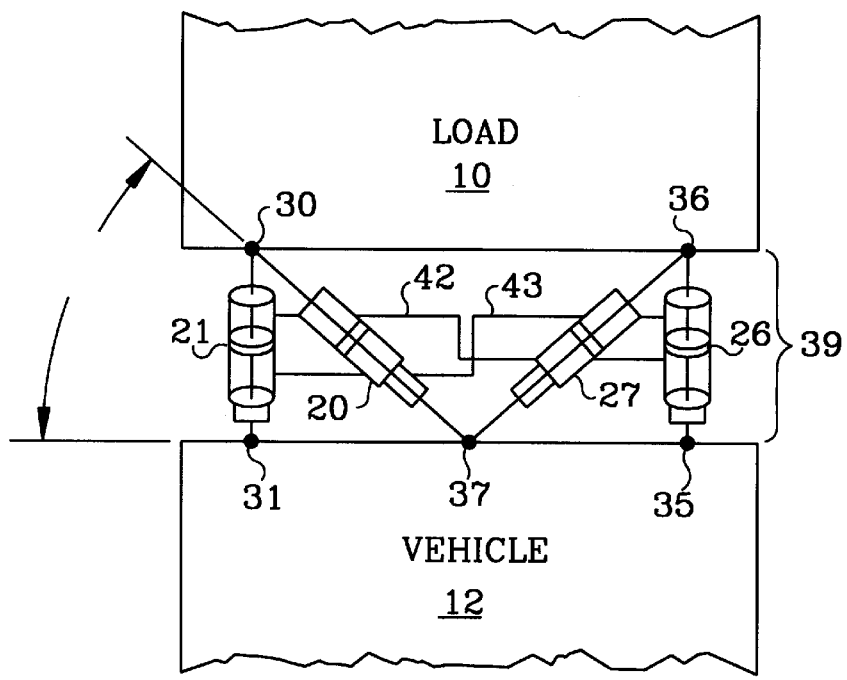

FIGS. 2a and 2b show how an arrangement of spring/dampers can be configured to support and isolate a load 10 from a launch vehicle 12. It is seen that eight spring/dampers shown by reference numerals 20–27 are configured in a rectangular arrangement in a vibration isolation section 29 between the load 10 and the vehicle 12. Each spring/damper is divided into first and second chambers by a piston as was the case in FIG. 1. The springs, such as spring 2 in FIG. 1, have not been shown in FIGS. 2a and 2b to avoid unnecessary complexity. It takes a minimum of six spring/dampers to fully constrain the system in all degrees of freedom but eight spring dampers have been shown in FIGS. 2a and 2b as a convenient number for the preferred embodiment. It will be understood that a number smaller or larger than eight spring/dampers may be used and configurations other than rectangular may be employed.

It is seen in FIGS. 2a and 2b that dampers 20 and 21 are connected together at a common point 30 to the load 10, dampers 21 and 22 are connected at a common point 31 to the vehicle 12, dampers 22 and 23 are connected at a common point 32 to the load 10, dampers 23 and 24 are connected at a common point 33 to the vehicle 12, dampers 24 and 25 are connected at a common point 34 to the load 10, dampers 25 and 26 are connected at a common point 35 to the vehicle 12, dampers 26 and 27 are connected at a common point 36 to the load 10 and dampers 27 and 20 are connected at a common point 37 to the vehicle 12. While I have shown the piston of each damper connected to piston of the adjacent dampers, these connections can be independent and connected to the load 10 and the vehicle 12 at individual points. Each spring/damper is at an angle $\alpha$ between the vehicle 12 and the load 10 as seen from the side in FIG. 2b and at an angle $\theta$ between the vehicle 12 and the load 10 as seen from the top in FIG. 2a. By adjusting angles $\alpha$ and $\theta$, the ratio of the various stiffness and damping in the rotational and translational axes may be adjusted. Unfortunately, the stiffness and damping about the rotational axes can only be controlled very slightly by changing the damper angles and while the rotational stiffness and damping can be better adjusted by spacing the dampers apart in larger and smaller mounting circles, this changes the space requirements of the system.

Figure 3:
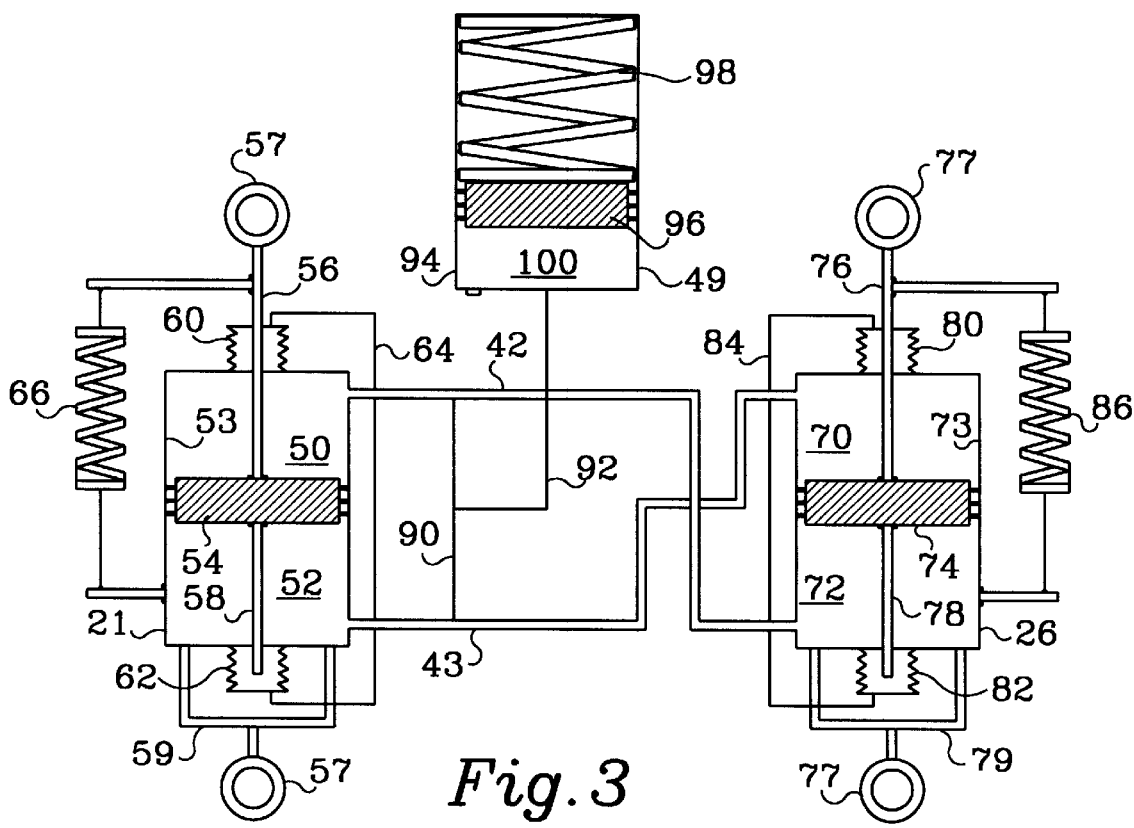

In the present invention, cross coupling conduits 40–47 are supplied to allow fluid flow between oppositely placed damper chambers and an accumulator 49 is connected to each cross coupled conduit by connections which may be better seen in FIG. 3.

In FIG. 3, two of the oppositely located dampers 21 and 26 are shown as an example, it being understood that each of the dampers and its oppositely placed counterpart in FIGS. 2a and 2b are similarly interconnected. In FIG. 3, damper 21 is shown having a first or upper chamber 50 and a second or lower chamber 52 within a housing 53, filled with an incompressible fluid and separated by a piston 54. No restricted passage through or around piston 54 is needed since fluid flow between chambers 50 and 52 is provided by cross conduits 42 and 43. A first piston rod 56 extends upwardly from piston 54 to the exterior of damper 21 where it will be connected to load 10 at point 30 (not shown in FIG. 2) by a pivot 57 similar to the pivot 9 of FIG. 1. A second piston rod 58 extends downwardly from piston 54 to the exterior of damper 21 where it will not connect to anything. The purpose of piston rod 58 is to provide an area on the lower surface of piston 54 which has the same area exposed to the fluid in the first and second chambers 50 and 52. This allows piston 54 to displace equal volumes (although of opposite signs) of the incompressible fluid in both chambers 50 and 52 when piston rod 56 is moved in or out of damper 21.

The housing 53 of damper 21 is shown connected by a "U" shaped structure 59 extending downwardly for connection to vehicle 12 at point 31 (not shown in FIG. 2) by another pivot 57 similar to the pivot 9 of FIG. 1.

Hermetic seals are shown using an upper or first bellows 60 and a lower or second bellows 62 on either end of damper 21 to provide a motion transmitting fluid seal for chambers 50 and 52. A conduit 64 joins the interiors of bellows 60 and 62 respectively and is selected to be relatively nonrestrictive to fluid flow. It is understood that various other sealing techniques can be used including sliding nonhermetic seals without effecting the operation of the present invention. A spring 66 which may be mounted as shown in FIG. 1, is shown mounted in FIG. 3 in a parallel load path with damper 21 to provide static stiffness. The spring arrangement can also be co-axial or distributed as in a flexible structure without effecting the operation of the present invention.

Damper 26 is arranged the same as damper 21 having a first or upper chamber 70 and a second or lower chamber 72 within a housing 73 separated by a piston 74. Again, no restricted passage through or around piston 74 is needed since fluid flow between chambers 70 and 72 is provided by cross conduits 42 and 43. A first piston rod 76 attached to piston 74 extends upwardly to the exterior of damper 26 where it will be connected to load 10 at point 36 (not shown in FIG. 3) through a pivot 77 similar to piston 9 of FIG. 1. A second piston rod 78 extends downwardly from piston 74 to the exterior of damper 26 where it will not connect to anything for the same reasons explained for damper 21. The housing of damper 26 is shown connected by a "U" shaped structure extending downwardly for connection to vehicle 12 at point 35 (not shown in FIG. 3) through another pivot 77 similar to pivot 9 of FIG. 1. Hermetic seals are shown using an upper or first bellows 80 and a lower or second bellows 82 to provide a motion transmitting fluid seal for chambers 70 and 72. A conduit 84 connects the interiors of bellows 80 and 82 to permit fluid flow therebetween. A spring 86, which may mounted like spring 2 in FIG. 1, is shown in FIG. 3 mounted in a parallel load path with damper 26 to provide stiffness. Damper 26 operates the same as damper 21.

The fluid conduit 42 is shown in FIG. 3 connected between the first chamber 50 of damper 21 and the second chamber 72 of damper 26. Similarly, the conduit 43 is shown connected between the second chamber 52 of damper 21 and the first chamber 70 of damper 26. A more restrictive conduit 90 is connected between conduits 42 and 43 and is connected to the accumulator 49 by a conduit 92. Accumulator 49 is shown having a housing 94 and a piston 96 positioned by a spring 98 to provide a pressurized chamber 100 within the housing 94 which operates to pressurize the system. Each of the oppositely positioned pairs of dampers in FIG. 1 is connected in the same fashion. It should also be understood that while I have shown a single accumulator 49 in FIG. 1 connected to all of the conduits 40–47, a plurality of accumulators could be used each connected to different pairs of conduits. After all connections are made, the system is evacuated and is filled with the incompressible fluid.

It is seen that translational motion of load 10 with respect to vehicle 12 causes the two dampers 21 and 26 of FIG. 3 to see the same direction and magnitude of motion. If, for example, payload 10 moves upward with respect to vehicle 12 then piston rods 56 and 76 of FIG. 3, move upward as do pistons 54 and 74 forcing the incompressible fluid out of chambers 50 and 70 through conduits 42 and 43, and into chambers 72 and 52 respectively. The area of pistons 54 and 74, the viscosity of the fluid and the length and diameters of lines 42 and 43 can be selected to provide the proper damping of this motion. No significant amount of fluid flows between conduits 42 and 43 through conduit 90 since the pressure is essentially equal across it.

The same action, above described, occurs with each of the oppositely disposed dampers in the arrangement of FIGS. 2a and 2b so that with translational motions, the cross coupling arrangements of conduits 40–47 provide the desired damping for the payload 10.

On the other hand, rotational motion of the payload 10 with respect to vehicle 12 causes the dampers 21 and 26 to see motion in opposite direction which may or may not be of equal magnitude depending on the angles of the damper and where the center of rotation of the payload 10 is located. If, for example, payload 10 is rotated clockwise in FIG. 2b around a line perpendicular to the plane of the Figure and passing through point 37, this motion causes point 30 to rise and point 36 to lower relative to the vehicle 12. Responding to this, damper 21 would see piston rod 56 and piston 50 try to rise while damper 26 would see piston rod 76 and piston 74 try to lower. However, since chambers 50 and 72 are connected by line 42 and filled with incompressible fluid, the motion is resisted by the fluid pressure in chamber 50 and 72. This increases the rotational stiffness over that of a conventional system since this rotation is resisted by both the springs and the hydraulics. This also causes a pressure difference between conduit 42 and conduit 43 forcing fluid through the highly restrictive conduit 90. The length and diameter of conduit 90 is selected to provide the proper damping for this rotation motion.

The same action, above described, occurs with each of the oppositely disposed dampers in the arrangement of FIGS. 2a and 2b so that with rotational motions the cross coupling arrangements of conduits 40–47 provide the desired damping for the payload 10.

In the event of a temperature variation which causes a change in volume of the fluid in the system, the chamber 100 in the accumulator 49 will expand or contract, as necessary, against the force of spring 98 to permit a flow of fluid between chamber 94 and the conduits 42 and 43 through conduit 92. Temperature variations are usually quite slow in nature so the necessary flow through the restrictive conduits 90 and 92 can be accomplished.

It is thus seen that the damping system shown herein, can be made soft and damped for translation motions, better isolating the payload from the vehicle vibrations while dynamically stiffening and damping the rotational motions to reduce the sway or rocking of the payload and reduce the rattle space required between the payload and the aerodynamic faring or to isolate a payload, such as an IMU, while retaining it's angular alignment.

Many variations and alterations will occur to those having skill in the art, as for example, while I have shown piston type dampers, bellows or other type dampers may also be employed and while I have shown eight dampers in a rectangular configuration, other numbers of dampers and different configurations may be employed. The springs can be discrete devices aligned co-linear with the dampers, or they may be located separately, or they can be a single distributed spring such as a compliant structure. Also, the mounting need not necessarily be at the bottom of the load and may be placed elsewhere, for example at the center of gravity. Accordingly, I do not wish to be limited to the specific structures used to describe the preferred embodiments of the invention.

The embodiments of the invention in which an exclusive property or right is claimed are defined as follows:

1. A suspension and damping system for use in mounting a first device to a second device, comprising:

spring means connecting the first and second devices to provide stiffness;

a first fluid chamber having a first end connected to the first device;

a second fluid chamber having a first end connected to the second device;

first means connecting the first and second chambers so that an increase in volume of the first chamber is accompanied by a decrease in volume of the second chamber;

a third fluid chamber having a first end connected to the first device, fourth fluid chamber having a first end connected to the second device;

second means connecting the third and fourth chambers so that an increase in volume of the third chamber is accompanied by a decrease in volume of the fourth chamber;

a first fluid passage connecting the first and fourth chambers; and a second fluid passage connecting the second and third chambers so that translational motions between the first and second devices is less stiff than rotational motions between the first and second devices.

2. Apparatus according to claim 1 further including a reservoir having a fluid connection to the first and second fluid passages to supply pressured fluid to the first, second, third and fourth chambers and to receive excess fluid due to temperature increases.

3. Apparatus according to claim 2 wherein the fluid connection is more restrictive to fluid flow than the first and second fluid passages.

4. Apparatus according to claim 1 wherein the first and second chambers are formed by a cylinder having a movable piston therein and the third and fourth chambers are formed by a cylinder having a movable piston therein.

5. An arrangement for mounting a first member to a second member so that translational motion therebetween is less stiff than rotational motion therebetween, comprising:

a plurality of dampers, each damper having first and second expandable fluid chambers connected together so that expansion of one of the first and second chambers is normally accompanied by contraction of the other of the first and second chambers and each damper having first and second external connectors with the first external connector of each damper connected to the first member and the second external connector of each damper connected to the second member to provide damping support between the first and second members;

a plurality of springs mounted in parallel with the dampers between the first and second members; and a plurality of fluid conduits with a first one of the fluid conduits joining the first expandable chamber of a first damper with the second expandable chamber of a second damper to permit fluid flow therebetween and a second of the fluid conduits joining the first expandable chamber of the second damper to the second expandable chamber of the first damper to permit fluid flow therebetween so that with translational movement between the first and second members the first expandable chambers of the first and second dampers both expand while the second expandable chambers of the first and second dampers both contract but with rotational movement between the first and second members, the first expandable chamber of the first damper and the second expandable chamber of the second damper both expand while the second expandable chamber of the first damper and the first expandable chamber of the second damper both contract.

6. Apparatus according to claim 5 wherein the number of dampers is eight and the connections to the first and second members forms a rectangle.

7. Apparatus according to claim 6 wherein the first and second ones of the dampers are disposed on opposite sides of the rectangle.

8. Apparatus according to claim 7 wherein third, fourth and fifth dampers are located respectively across the rectangle from sixth, seventh and eighth dampers and further including a third, fourth and fifth of the fluid conduits joining the first expandable chamber of the third, fourth and fifth dampers with the second expandable chamber of the sixth, seventh and eighth dampers respectively to permit fluid flow therebetween and sixth, seventh and eighth of the fluid conduits joining the first expandable chamber of the sixth, seventh and eighth dampers to the second expandable chamber of the third, fourth and fifth dampers respectively to permit fluid flow therebetween.

9. Apparatus according to claim 5 wherein the plurality of dampers each comprise a housing having a piston therein separating the housing into the first and second chambers and a piston rod connected to each piston extends out of the housing to form the first external connector and a connector from each housing forms the second external connector.

10. Apparatus according to claim 5 further including an accumulator and a fluid passage connected to the first and second conduits to permit flow of fluid from the first and second conduits and the accumulator.

11. Apparatus according to claim 10 wherein the accumulator includes a container for supplying fluid under pressure to the expandable chambers and for receiving excess fluid due to temperature changes.

12. Apparatus according to claim 11 wherein the chamber includes a piston supported by a spring to permit expansion and contraction.

13. Apparatus for dampingly supporting a payload of a missile from a launch vehicle movable along a launch axis so that the payload may respond to translational motions between the payload and the launch vehicle with a first stiffness but respond to rotational motions between the payload and the launch vehicle with a second stiffness greater than the first stiffness comprising:

a plurality of at least six fluid dampers each including a housing and a joining device which separates the housing into first and second changeable volume chambers, each damper connected between the payload and the launch vehicle at angles with respect to the launch axis thereto to provide damping support therebetween and so that together, when viewed along the launch axis, the dampers form a closed geometrical shape around the launch axis to provide support between the payload and the launch vehicle; and, a plurality of fluid conduits one each joining a first chamber in one each of the dampers to a second chamber in another each of the dampers located across the geometrical shape therefrom so that when translational force along the launch axis occurs the volume of the first chamber of each damper is changed in a direction to cause fluid in the second chamber of its oppositely disposed damper to change volume in the opposite direction to provide soft damping and so that when rotational force between the payload and the launch vehicle occurs, the volume of the first chamber of each damper is changed in a direction to cause fluid in the second chamber of its oppositely disposed damper to change volume in the same direction to provide hard damping.

14. Apparatus according to claim 13 wherein the number of dampers is eight and the geometric shape is a rectangle.

15. Apparatus according to claim 14 further including an accumulator connected to receive excess fluid from the dampers and to pressurize the system of dampers.

16. Apparatus according to claim 13 wherein the dampers each comprise a housing and a piston in the housing to divide the space therein into the first and second chambers.

17. Apparatus according to claim 16 wherein the dampers each comprise a housing and a piston in the housing to divide the space therein into the first and second chambers.

18. Apparatus according to claim 17 further including an accumulator connected to receive excess fluid from the dampers and to pressurize the system of dampers.

19. Apparatus according to claim 18 wherein the accumulator is connected to the dampers by a fluid connection that is more restricted than the fluid conduits.

20. Apparatus according to claim 13 further including a spring connected in parallel with each damper.

* * * * *